United States Patent
Goyal et al.

(12)
(10) Patent No.: US 6,215,864 B1
(45) Date of Patent: Apr. 10, 2001

(54) METHOD OF ACCESSING AN IP IN AN ISDN NETWORK WITH PARTIAL RELEASE

(75) Inventors: Devki Nandan Goyal; Nigel Henry Baker, both of Glendale, AZ (US)

(73) Assignee: AG Communication Systems Corporation, Phoenix, AZ (US)

(*) Notice: Subject to any disclaimer, the term of this patent is extended or adjusted under 35 U.S.C. 154(b) by 0 days.

(21) Appl. No.: 09/005,737

(22) Filed: Jan. 12, 1998

(51) Int. Cl.[7] ........................................ H04M 3/42
(52) U.S. Cl. ............................. 379/207; 379/88.01
(58) Field of Search ........................... 379/88.01, 88.03, 379/201, 207, 219, 229; 370/110.1

(56) References Cited

U.S. PATENT DOCUMENTS

| | | | |
|---|---|---|---|
| 5,043,983 | * | 8/1991 | Dorst et al. ........................ 370/110.1 |
| 5,046,183 | * | 9/1991 | Dorst et al. ........................ 370/110.1 |
| 5,163,087 | | 11/1992 | Kaplan . |
| 5,289,472 | * | 2/1994 | Cho .................................... 370/110.1 |
| 5,490,251 | | 2/1996 | Clark et al. . |
| 5,864,614 | * | 1/1999 | Farris et al. .......................... 379/207 |

* cited by examiner

Primary Examiner—Scott L. Weaver
(74) Attorney, Agent, or Firm—David J. Zwick (57) ABSTRACT

A method and system in an ISDN network for exchanging call control information between a switch and an IP, and for call set-up and call clearing for intermediate access to an IP. The invention utilizes the User-User Information (UUI) element of the Q.931 messages to exchange call information between a switch and an IP. A subscriber call results in a connection being established to an IP. A request to the IP is encoded in the UUI element of a SETUP message, and call routing information is encoded in the UUI element of a returned DISCONNECT message. The DISCONNECT message causes a partial call release of only the circuit segments from the IP back to the switch. The circuit segments from the calling party to the switch are maintained. The switch then routes the user call to a final destination based on information contained in the UUI element of the DISCONNECT message.

30 Claims, 10 Drawing Sheets

FIG. 1

BIT POSITION

| | 8 | 7 | 6 | 5 | 4 | 3 | 2 | 1 |
|---|---|---|---|---|---|---|---|---|
| 1 | PROTOCOL DISCRIMINATOR ||||||||
| 2 | 0 | 0 | 0 | 0 | LENGTH OF CALL REFERENCE VALUE ||||
| 3 | FLAG | CALL REFERENCE VALUE |||||||
| 4 | MESSAGE TYPE ||||||||
| 5+ | OTHER INFORMATION ELEMENTS AS REQUIRED ||||||||

OCTET

FIG. 2
*(PRIOR ART)*

BIT POSITION

| | 8 | 7 | 6 | 5 | 4 | 3 | 2 | 1 |
|---|---|---|---|---|---|---|---|---|
| 1 | 0 | 1 | 1 | 1 | 1 | 1 | 1 | 0 |
| 2 | LENGTH OF USER-USER INFORMATION ||||||||
| 3 | PROTOCOL DISCRIMINATOR ||||||||
| 4+ | USER INFORMATION ||||||||

OCTET

FIG. 3
*(PRIOR ART)*

| | BIT POSITION | | | | | | | |
|---|---|---|---|---|---|---|---|---|
| | 8 | 7 | 6 | 5 | 4 | 3 | 2 | 1 |
| 1 | 0 | 1 | 1 | 1 | 1 | 1 | 1 | 0 |
| 2 | LENGTH OF USER-USER INFORMATION ||||||||
| 3 | PROTOCOL DISCRIMINATOR = USER (0) ||||||||
| 4 | OPERATION = SEND TO IP RESOURCE (0) ||||||||
| 5 | IP RESOURCE TYPE = RECOGNIZE VOICE (4) ||||||||
| 6 | SERVICE TYPE = IMMEDIATE ACCESS (0) ||||||||
| 7 | MWI TONE (0=FALSE, 1=TRUE) ||||||||
| 8 | USER DN 2 |||| USER DN 1 ||||
| 9 | USER DN 4 |||| USER DN 3 ||||
| 10 | USER DN 6 |||| USER DN 5 ||||
| 11 | USER DN 8 |||| USER DN 7 ||||
| 12 | USER DN 10 |||| USER DN 9 ||||

OCTET (rows 1–12)

*FIG. 4*

| Octet | Bit 8 | Bit 7 | Bit 6 | Bit 5 | Bit 4 | Bit 3 | Bit 2 | Bit 1 |
|---|---|---|---|---|---|---|---|---|
| 1 | 0 | 1 | 1 | 1 | 1 | 1 | 1 | 0 |
| 2 | LENGTH OF USER-USER INFORMATION ||||||||
| 3 | PROTOCOL DISCRIMINATOR = USER (0) ||||||||
| 4 | OPERATION = SEND TO IP RESOURCE (0) ||||||||
| 5 | LENGTH OF IP COLLECTED DIGITS ||||||||
| 6 | EVEN/ODD | NATURE OF NUMBER |||||||
| 7 | 0 | NUMBERING PLAN || 0 | 0 | 0 | 0 |
| 8 | CALLED DN 2 |||| CALLED DN 1 ||||
| 9 | CALLED DN 4 |||| CALLED DN 3 ||||
| 10 | CALLED DN 6 |||| CALLED DN 5 ||||
| ... | ... |||| ... ||||
| 21 | CALLED DN 28 |||| CALLED DN 27 ||||

FIG. 5

|  | BIT POSITION | | | | | | | |
|---|---|---|---|---|---|---|---|---|
|  | 8 | 7 | 6 | 5 | 4 | 3 | 2 | 1 |
| OCTET 1 | 0 | 1 | 1 | 1 | 1 | 1 | 1 | 0 |
| OCTET 2 | LENGTH OF USER-USER INFORMATION ||||||||
| OCTET 3 | PROTOCOL DISCRIMINATOR = USER (0) ||||||||
| OCTET 4 | OPERATION = ERROR (1) ||||||||
| OCTET 5 | ERROR CODE ||||||||

METHOD OF ACCESSING AN IP IN AN ISDN NETWORK WITH PARTIAL RELEASE

FIELD OF THE INVENTION

The present invention relates to telecommunications networks, and more particularly to exchanging call control information between a switch and an IP, and to call set-up and call clearing for intermediate access to an IP in an ISDN network.

BACKGROUND OF THE INVENTION

A major push in telecommunications today is the ability to offer services in support of the telecommunications environment that are not directly involved in call control functions. These services include, for example, geographic routing of centrally dialed calls to a branch location nearest the caller and voice activated dialing (VAD).

The architectural groundwork for these services was laid with the deployment of the Integrated Services Digital Network (ISDN) protocol for digital data transmission between network elements, as generally described in Bell Communications Research publication TR-NWT-001268, "ISDN Primary Rate Interface Call Control Switching and Signaling Generic Requirements," Issue 1, Rev. 2, March 1994, Morristown, N.J., the ISUP protocol for interworking communications between ISDN networks, as generally described in American National Standards Institute (ANSI) standard T1.113-1995, "Signalling System Number 7 (SS7)—Integrated Services Digital Network (ISDN) User Part," 1995, New York, N.Y., and the SS7 protocol which, inter alia, transports ISUP messages, and is generally described in ANSI publications T1.110-1992, "Signalling System No. 7 (SS7)—General Information," 1992, New York, N.Y., and the other standards in this series, T1.111-1992, T1.112-1988, T1.114-1996, T1.115-1996, T1.116-1990, and T1.118-1992.

ISDN is generally defined as a network that provides end-to-end digital connectivity to support a wide range of telecommunication services, including voice and non-voice services, to which users have access by a limited set of standard customer interfaces. ISDN is implemented on the existing public switched telephone network (PSTN) to carry a digital signal instead of the conventional analog voice signal. Access to the ISDN network is through one of two defined access interfaces: the basic rate interface (BRI) and the primary rate interface (PRI). With BRI, the digital information is transmitted over three multiplexed channels: two 64 kilobits per second (kbps) bearer channels ("B" channels) are provided for voice or data connections, and one 16 kbps signaling channel ("D" channel) is provided for exchanging control information between user and network. In PRI, there are 24 multiplexed channels: 23 B channels and one D channel. Control information exchanged on the D channel includes call set-up transactions necessary to establish a connection on a B channel. Implementation of ISDN requires upgrades to central office switching and transmission equipment at a minimum, with full implementation also requiring special user terminal equipment.

The communications protocol for the ISDN network is designed as a structured set of protocols which form a hierarchy. Each protocol of the hierarchy is referred to as a "layer" and each layer is dedicated to a specific function or a set of functions. Of particular interest to the present invention is the protocol governing the network layer (layer 3) of the D channel protocol. Specific functions performed by layer 3 include: processing of primitives for communicating with the data link layer, administration of timers and logical entities used in call control procedures, and administration of access resources including B channels. The following general functions may also be performed by layer 3: routing and relaying of messages, network connections, network connection multiplexing, segmenting and blocking of long messages, error detection, error recovery, sequencing, and flow control.

Layer 3 of the D channel protocol is defined in International Telecommunication Union—Telecommunication Standardization Sector (ITU-T) standards publication ITU-T Q.931, "Digital Subscriber Signalling System No. 1 (DSS 1)—ISDN User-Network Interface Layer 3 Specification for Basic Call Control," March 1993, which is hereby incorporated by reference.

ISDN has enabled the implementation of many useful features based primarily on the ability of ISDN to deliver the calling party's directory number to the called party.

A market push for more complex enhanced services offerings has led to the development of the Advanced Intelligent Network (AIN) protocol, as described in Bell Communications Research publication GR-1129-CORE, "Advanced Intelligent Network (AIN) 0.2 Switch— Intelligent Peripheral Interface (IPI) Generic Requirements," December 1995, Issue 1, Rev. 2. AIN provides for a large set of services to the customer and allows the telephone, data and signaling networks to easily adapt to technological advances. The AIN architecture encompasses programmable, reusable functionality for network systems (service control points, adjuncts, and intelligent peripherals), network elements (AIN service switching points, non-AIN switching systems, network access points, and signal transfer points) and operating systems. A primary feature of AIN is the use of software "triggers" on AIN-provisioned switches. Trigger criteria are used to define when a call requires special handling. When a defined set of trigger criteria are satisfied, the trigger logic of the switch suspends call processing, sends a service query message to a service control point (SCP) to request information on how to handle the call. Upon receiving a response message from the SCP that includes call routing information, the switch resumes call processing and routes the call as indicated in the response message. The major service drivers for AIN were Personal Communications Services (PCS) network access services and VAD. However, AIN architecture is not limited in any respect to these two applications. Full implementation of AIN also requires upgrades to central office switching and other network and transmission equipment.

In today's telecommunication network, ISDN is deployed in almost all major metropolitan areas with some deployment throughout the rest of the PSTN network. AIN does not share a similarly wide deployment. This presents a problem in satisfying customer demands for enhanced services that are geared to AIN.

Accordingly, it is an object of the present invention to provide a method of implementing AIN-like services in an ISDN network.

SUMMARY OF THE INVENTION

The present invention is a method and system in an ISDN network for exchanging call control information between a switch and an IP, and for call set-up and call clearing for intermediate access to an IP.

The invention utilizes the User-User Information (UUI) element of the Q.931 messages to exchange call information between a switch and an IP. A subscriber call results in a connection being established to an IP. A request to the IP is encoded in the UUI element of a SETUP message, and call routing information is encoded in the UUI element of the returned DISCONNECT message.

The DISCONNECT message results in the partial call release of only the circuit segments from the IP back to the switch. The circuit segments from the calling party to the switch are maintained. Based on information contained in the UUI element of the DISCONNECT message, the switch then routes the user call to a final destination directory number.

DESCRIPTION OF THE PREFERRED EMBODIMENT

The present invention is embodied in a voice activated dialing (VAD) system that resides on an intelligent peripheral (IP) in an ISDN network. The invention uses the Q.931 call control protocol to connect a calling party of an ISDN switch to the voice recognition circuits of a VAD application on the IP over a voice channel. When the VAD application has determined the directory number (DN) to which the calling party wishes to be connected, a Q.931 DISCONNECT message is generated and sent from the IP to the switch. Included in the DISCONNECT message is a User—User Information (UUI) element that contains the DN to which the calling party wishes to be connected. The DISCONNECT message from the IP causes a partial call release of only the voice connection segments between the IP and the switch. The switch then decodes the desired DN contained in the UUI element of the DISCONNECT message, and the connection of the calling party to the switch is routed to the desired DN.

The conventional purpose of the UUI element is to convey information between ISDN users. The standards state that this information is not interpreted by the network, but rather is transported transparently by an ISDN between a call originating entity, e.g. a calling user, and the addressed entity, e.g. a remote user or a high layer function network node addressed by the call originating entity. In addition, the standards call for a DISCONNECT message generated by a user or the network to result in a complete call clearing of all circuit segments between the calling party and the destination.

In the present invention, the use of the UUI element to transfer information between a switch and an IP, and the intervention of the switch in the call clearing process to continue the call to another destination are non-conventional and novel uses of the Q.931 protocol.

Figure 1:
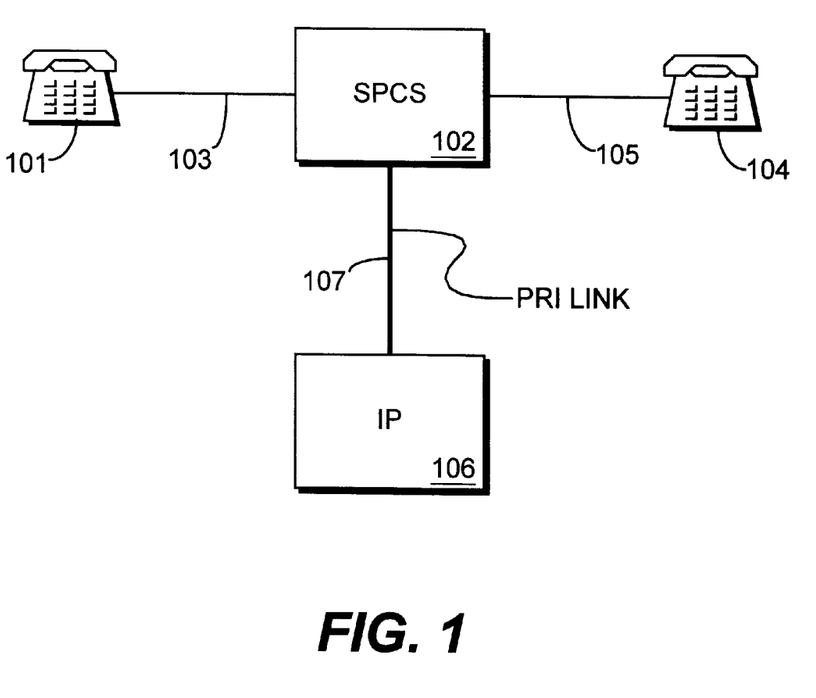
FIG. 1 shows a block diagram of the VAD system of the present invention.

FIG. 1 shows a block diagram of the VAD system of the preferred embodiment of the present invention. Terminal equipment (TE) 101 is a user telephone connected over connection 103 to stored-program-control switch (SPCS) 102, for example, a GTD-5® by AG Communication Systems Corporation. SPCS 102 is provisioned as part of :an ISDN network. TE 104 is also connected to SPCS 102 over connection 105. While FIG. 1 shows TE 101, TE 104 and IP 106 as being directly connected to SPCS 102, more typically each of these components would be connected to SPCS 102 through various network elements and systems.

Intelligent peripheral (IP) 106 is a platform, for example a PC, that is part of the ISDN network and supports a VAD application. The VAD application can utilize, for example, one of the Antares™ line of computer expansion boards by Dialogic Corp. that support automatic speech recognition (ASR) applications. These boards are installed in a PC and can be configured to support speaker independent and speaker dependent ASR applications. Speaker independent ASR applications typically have a limited vocabulary, for example, the words yes and no, the digits zero through nine and oh. Speaker dependent applications can be trained to recognize an extensive vocabulary that is specific to each user. For example, the phrase phone home can be translated into the user's home telephone number. IP 106 is connected to SPCS 102 over connection 107, which preferably is a primary rate ISDN interface (PRI).

Intelligent peripherals are well known in the art and are not discussed here in detail. Numerous platform vendors offer a wide range of hardware and software solutions that will satisfy the requirements of the present invention, as well as related requirements that a designer skilled in the art may have.

In operation overview, when TE 101 goes off-hook, SPCS 102 accesses its associated user database to determine if TE 101 is subscribed to any services. If TE 101 is subscribed to the VAD service, SPCS 102 selects an idle B channel on PRI link 107 and generates and sends a Q.931 SETUP message over the signaling trunk of ISDN link 107 to IP 106 requesting that a bearer channel connection be established between TE 101 and IP 106 over the selected B channel. The Q.931 record contains the calling party 101 directory number (DN) in the UUI element to allow for VAD applications that are customized to the subscriber. When a bearer channel connection over link 107 is established, the user is connected to the VAD application on IP 106. The user then interacts with the VAD application on IP 106, and a called party 104 DN is established. IP 106 then generates and sends to SPCS 102 a Q.931 DISCONNECT message containing the called party 104 DN in the UUI element. SPCS 102 then clears the bearer channel segment between IP 106 and SPCS 102 and routes the call from SPCS 102 to TE 104 based on the called party 104 DN contained in the UUI element of the DISCONNECT message.

Figure 2:
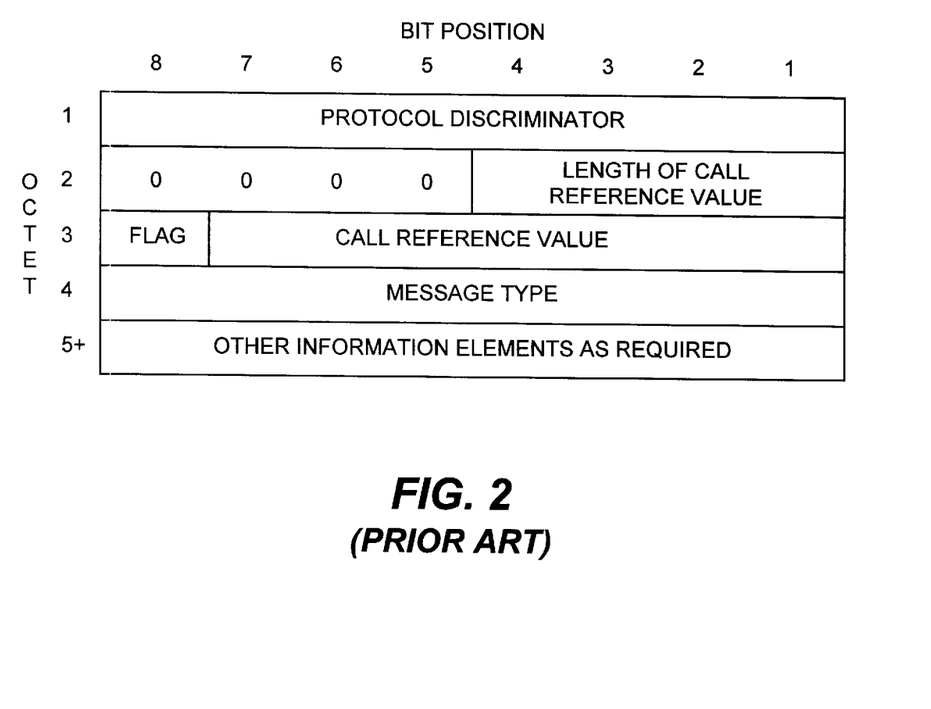
FIG. 2 shows the basic structure of Q.931 protocol messages.

Referring now to FIG. 2, the basic Q.931 message structure is shown. Each message comprises a set of mandatory and optional information elements that are either of fixed length or of variable length. The data is organized in eight-bit bytes, referred to as octets. In the Q.931 protocol, every message begins with the following mandatory information elements: protocol discriminator in octet 1; call reference in octets 2 and 3; and message type in octet 4. The protocol discriminator and message type elements are fixed length single octet, while the call reference element is variable length but is shown as two octets for simplicity. Based on each message type, other mandatory and optional information elements of both fixed and variable lengths follow the initial three required elements. A detailed description of the Q.931 protocol messages is contained in the Q.931 standard.

Of particular interest to the present invention is the UUI element. The stated purpose of the UUI element is to convey information between ISDN users. According to the Q.931 standard, this information is not interpreted by the network, but rather is transported transparently by the ISDN between a call originating entity and the addressed entity. There are no restrictions on content of the UUI element information field. The UUI element can be included in most of the call establishment and call clearing message types of the Q.931 protocol.

In the present invention, the call control messages exchanged between SPCS 102 and IP 106 that control the bearer channel connection between TE 101 and IP 106 are in accordance with the Q.931 protocol. Explicit protocol support of VAD applications residing on IPs, such as the VAD application of the present invention residing on IP 106, is not included in the Q.931 protocol, but rather in the AIN 0.2 protocol, which, in the preferred embodiment, is not implemented on this portion of the network. To overcome this difficulty, the present invention uses the UUI element of the Q.931 protocol to transport information between SPCS 102 and IP 106 that would normally be exchanged as elements of the AIN 0.2 protocol, allowing implementation of the VAD application in a non-AIN ISDN network. The present invention uses element names taken from the AIN 0.2 protocol to identify corresponding elements transported in the Q.931 UUI elements of the present invention.

Figure 3:
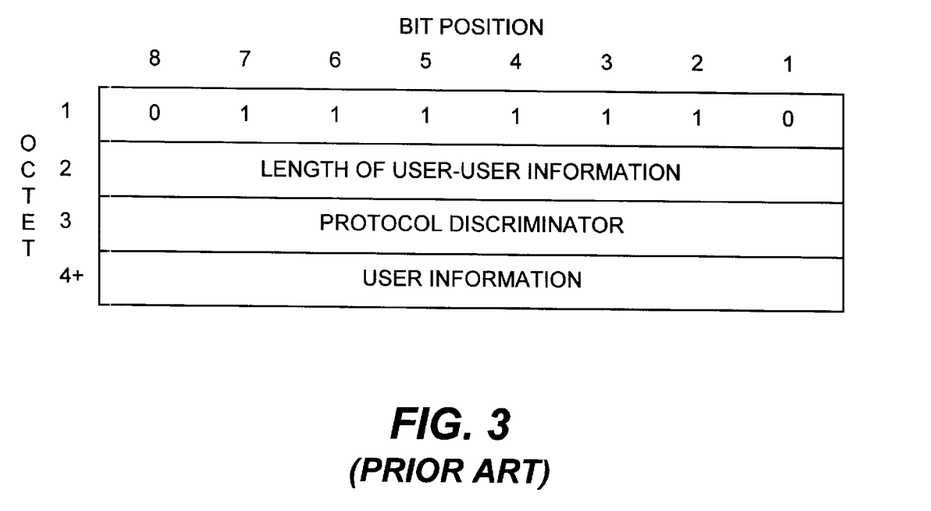
FIG. 3 shows the basic structure of the User—User Information (II) element of the Q.931 protocol.

FIG. 3 shows the basic structure of the Q.931 UUI element. Octet 1 is the information element identifier for all UUI elements. Octet 2 is the length of the UUI element. Octet 3 is the protocol discriminator element. Octets 4, et seq. contain the user information to be transported.

Figure 4:
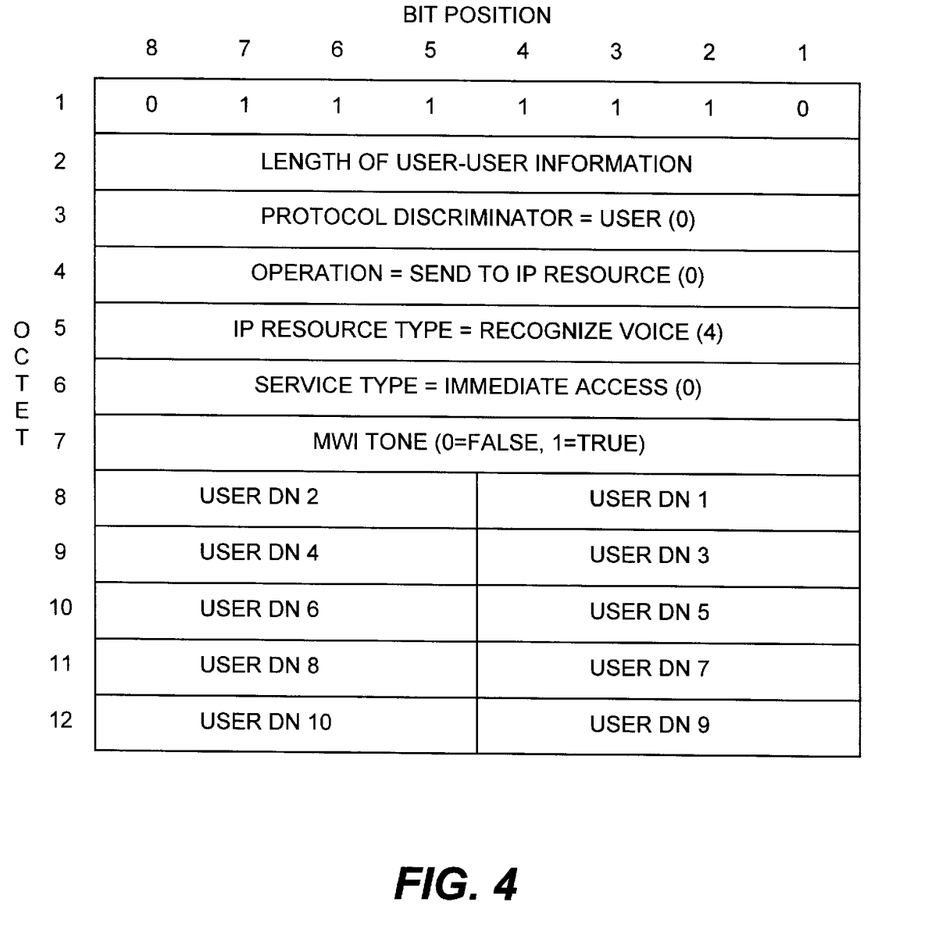
FIG. 4 shows the structure of the UUI element included in the SETUP message of the present invention.

FIG. 4 shows the UUI element of the present invention that is included in the SETUP message that is sent from SPCS 102 to IP 106. This message is used to request that IP 106 establish a PRI bearer channel connection with TE 101. The UUI element of the SETUP message contains information needed by IP 106 to execute the VAD application on behalf of the subscriber. In this UUI element, as well as the other UUI elements of the present invention, the protocol discriminator element in octet 3 has a value of 0, indicating that the protocol employed in the UUI element is user defined. Octet 4 of this UUI element contains the operation element, corresponding to the same-named AIN 0.2 element. The operation element is set to a value of "sendToIPResource," which indicates that the UUI information relates to an information exchange between a switch and an IP. Octet 5 contains the IPResourceType element, also corresponding to the same-named AIN 0.2 element. This element contains the value "recognize voice," indicating that the WUI information relates to a VAD application on the IP. Octets 6 through 12 contain information corresponding to the required elements associated with an AIN 0.2 protocol IPResourceType of "recognize voice." Octet 6 contains the ServiceType element, with a value of "immediate access." Octet 7 contains the MwiTone element, which is used to sound a tone indicating if the user has messages waiting. This element can have the values of "True" or "False." Octets 8 through 12 contain the UserDN element, which identifies the telephone number of the calling subscriber accessing the VAD application.

Although the layout and format of the information in the UUI element is arbitrary, a design decision was made to follow the naming and format conventions of corresponding elements in the AIN 0.2 protocol. The decision aides in the clarity of purpose and understanding of the elements within the UUI elements of the present invention, and for compatibility of functions on IP 106 that may be interacting within the AIN 0.2 protocol with other network elements.

Figure 5:
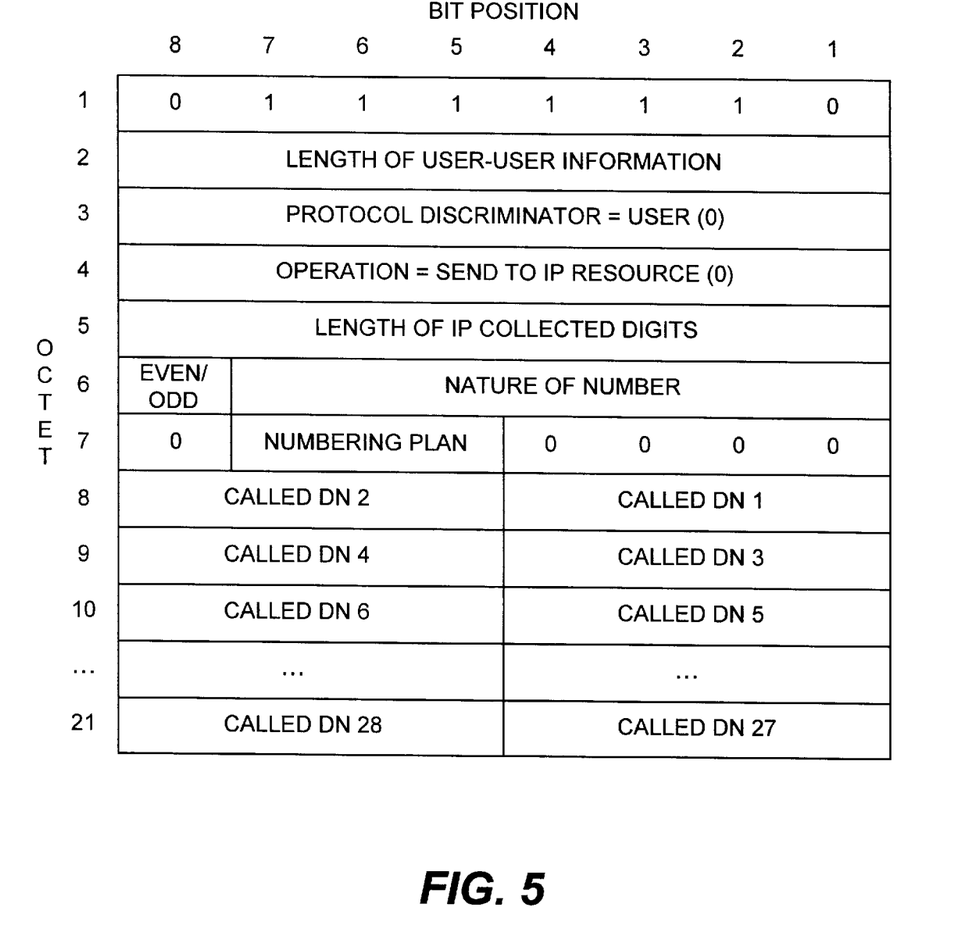
FIG. 5 shows the structure of the UUI element included in the DISCONNECT message of the present invention.

FIG. 5 shows the UUI element included in the DISCONNECT message that is sent from IP 106 to SPCS 102. This message would be the first of a normal call clearing sequence of the bearer channel connection between TE 101 and IP 106. The UUI element of the DISCONNECT message contains information needed by SPCS 102 to route the telephone call desired by the subscriber between TE 101 and TE 104. Octet 4 contains the Operation element with a value of "sendToIPResource." Octets 5 through 21 contain information required by SPCS 102 to route the call. Octet 5 contains a value between 3 and 16 indicating the number of octets in the IP Collected Digits parameter, which comprises the octets from octet 6 through the last used octet of the UUI element. The Nature of Number element of Octet 6 is used to indicate, for example, whether the collected digits represent a local or national DN. The Even/Odd element of octet 6 indicates whether the last nibble of the last octet of the Collected Digits parameter contains a collected digit. Octet 7, bits 5 through 7, is the numbering plan element, which is defaulted to indicate ISDN. The other bits of octet 7 are unused and set to a value of 0. Octets 8 through a maximum of 21 contain the called DN element, which identifies the directory number of TE 104 to which the subscriber wishes to be connected.

Figure 6:
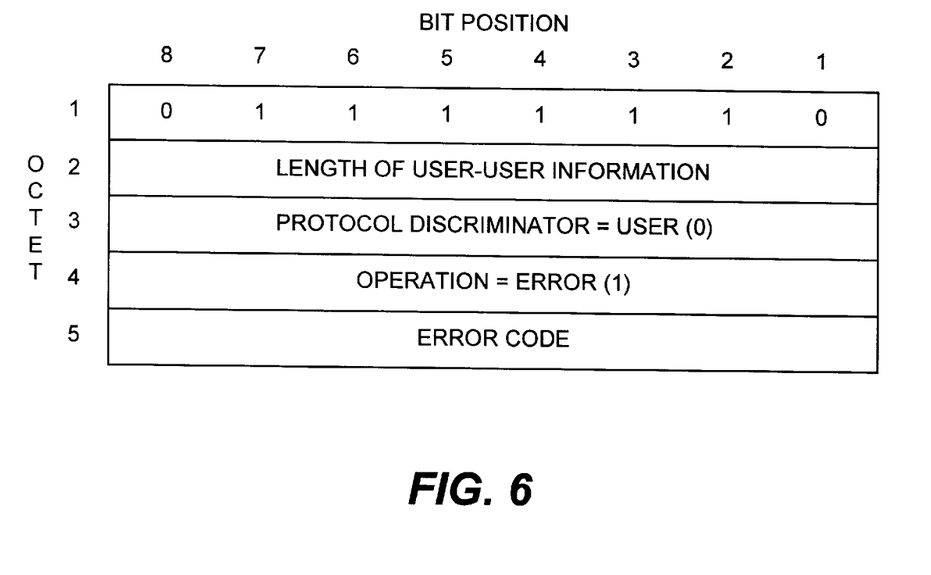
FIG. 6 shows the structure of the UUI element included in the DISCONNECT or RELEASE_COMPLETE message of the present invention when an error situation is encountered he IP.

FIG. 6 shows the UUI element included in a DISCONNECT or RELEASE_COMPLETE message when an error situation is encountered at IP 106. Octet 4 contains the operation element with a value of "Error," and octet 5 contains the error code element.

FIGS. 7 to 11 show message flow diagrams for various invocations of the VAD application of the present invention. All messages are in the context of the Q.931 protocol.

Figure 7:
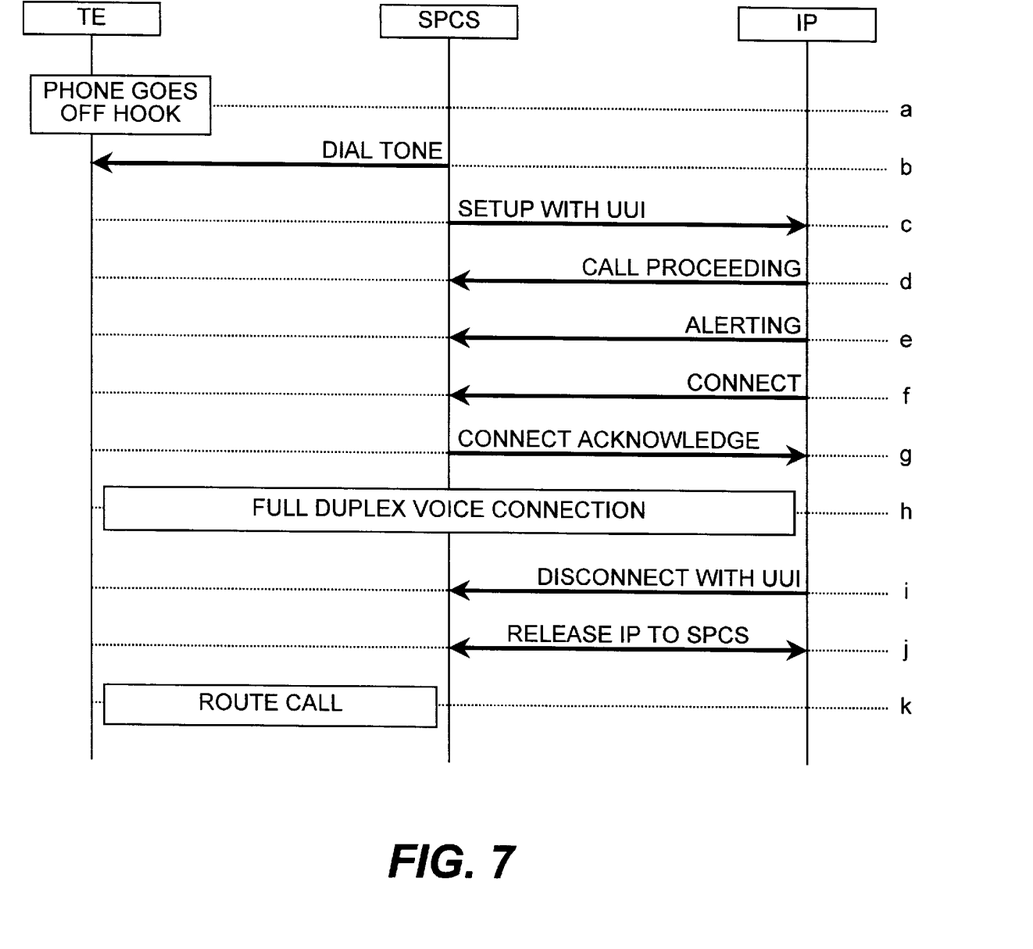
FIG. 7 shows a message flow diagram for the successful invocation of the VAD application of the present invention.

FIG. 7 shows a message flow diagram for the normal successful invocation of the VAD application of the present invention. At a, subscriber telephone 101 goes off-hook. SPCS 102 detects the off-hook condition and performs a look-up in its user database of the subscriber's database entry. At b, when it is determined that the subscriber has VAD service, SPCS 102 may optionally assert dial tone on the line for a programmable period of time to allow a user with a modem to detect dial tone. A DTMF receiver to collect digits is also connected to the line. At c, SPCS 102 selects an idle B-channel from the PRI trunk group 107 and generates a SETUP message requesting the selected B-channel and transmits the message to IP 106. The SETUP message contains a UUI element as shown in FIG. 4. At d, IP 106 may respond to the SETUP message with an optional CALL PROCEEDING message indicating that call establishment has been initiated. At e, IP 106 may send an optional ALERTING message to SPCS 102. At f, IP 106 accepts the call, establishes a connection to SPCS 102 over the requested B-channel, and sends a CONNECT message to SPCS 102. At g, SPCS 102 responds to the CONNECT message by sending a CONNECT ACKNOWLEDGE message and stops dial tone to TE 101. At h, full duplex voice connection between TE 101 and IP 106 has been established. At this point, the subscriber is interacting with the VAD application on IP 106. At i, the subscriber has completed the interaction with the VAD application, a called DN 104 has been determined, and IP 106 generates and sends a DISCONNECT message to SPCS 102 to free the B-channel. This message contains a UUI element as shown in FIG. 5. The DTMF receiver is also disconnected at this time. At j, SPCS 102 and IP 106 complete a call clearing sequence of the circuit segment between them. At k, SPCS 102, has the collected digits from the UUI element in the DISCONNECT message, and routes the call to TE 104 based on the collected digits.

Should an error condition be encountered at IP 106 after a connection has been established at h, IP 106 will generate and send a DISCONNECT message to SPCS 102 with a UUI element as shown in FIG. 6 containing information on the error condition, followed by a normal call clearing sequence of all circuit segments. At this point, SPCS 102 applies dial tone to the line and the call proceeds as if no interaction with IP 106 had occurred.

Figure 8:
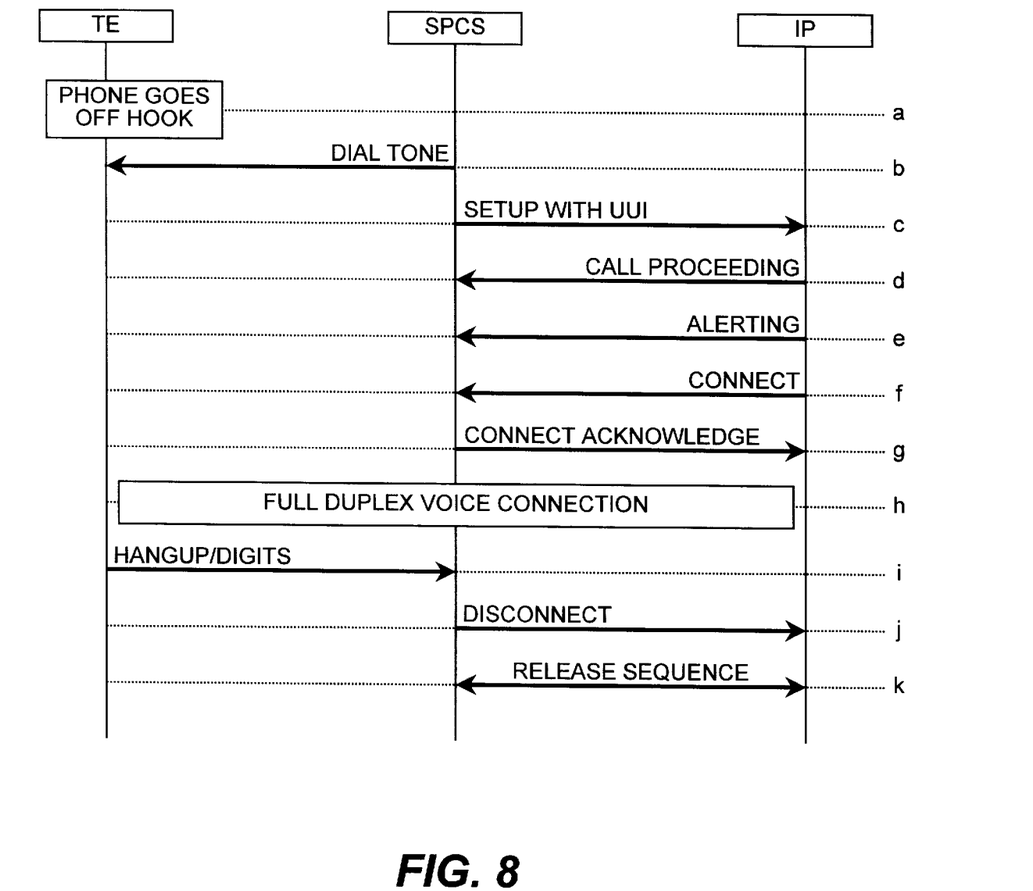
FIG. 8 shows a message flow diagram for the situation in which the subscriber either begins to dial digits or hangs up the phone after connection to the IP has been established.

FIG. 8 shows a message flow diagram for the situation in which the subscriber either begins to dial digits or hangs up the phone after connection to IP 106 has been established. In this situation, steps a through h are the same as in FIG. 7. At i, if the subscriber begins to dial digits on TE 101, then at j, SPCS 102 generates and sends a DISCONNECT message to IP 106 to free the B-channel, and at k, SPCS 102 and IP 106 complete a call clearing sequence for the circuit segment between them. At this point, SPCS 102 is collecting digits on the DTMF receiver, and the call proceeds as if no interaction with IP 106 had occurred. If at i, the subscriber hangs up TE 101, then at j, SPCS 102 generates and sends a DISCONNECT message to IP 106, and at k, SPCS 102 completes a normal call clearing sequence of all circuit segments of the call.

Figure 9:
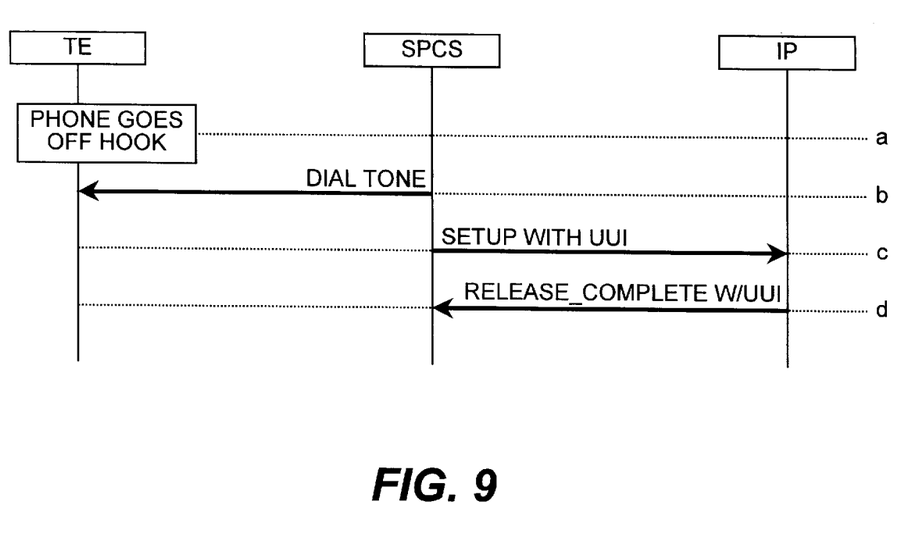
FIG. 9 shows a message flow diagram for the situation in which an error is encountered at the IP prior to establishing a connection.

FIG. 9 shows a message flow diagram for the situation in which an error is encountered at IP 106 prior to establishing a connection. In this situation, steps a through c are the same as in FIG. 7. At d, IP 106 generates and sends a RELEASE COMPLETE message with a UUI element as shown in FIG. 6, containing information on the error condition. At this point, SPCS 102 applies dial tone to the line and the call proceeds as if no interaction with IP 106 had occurred.

Figure 10:
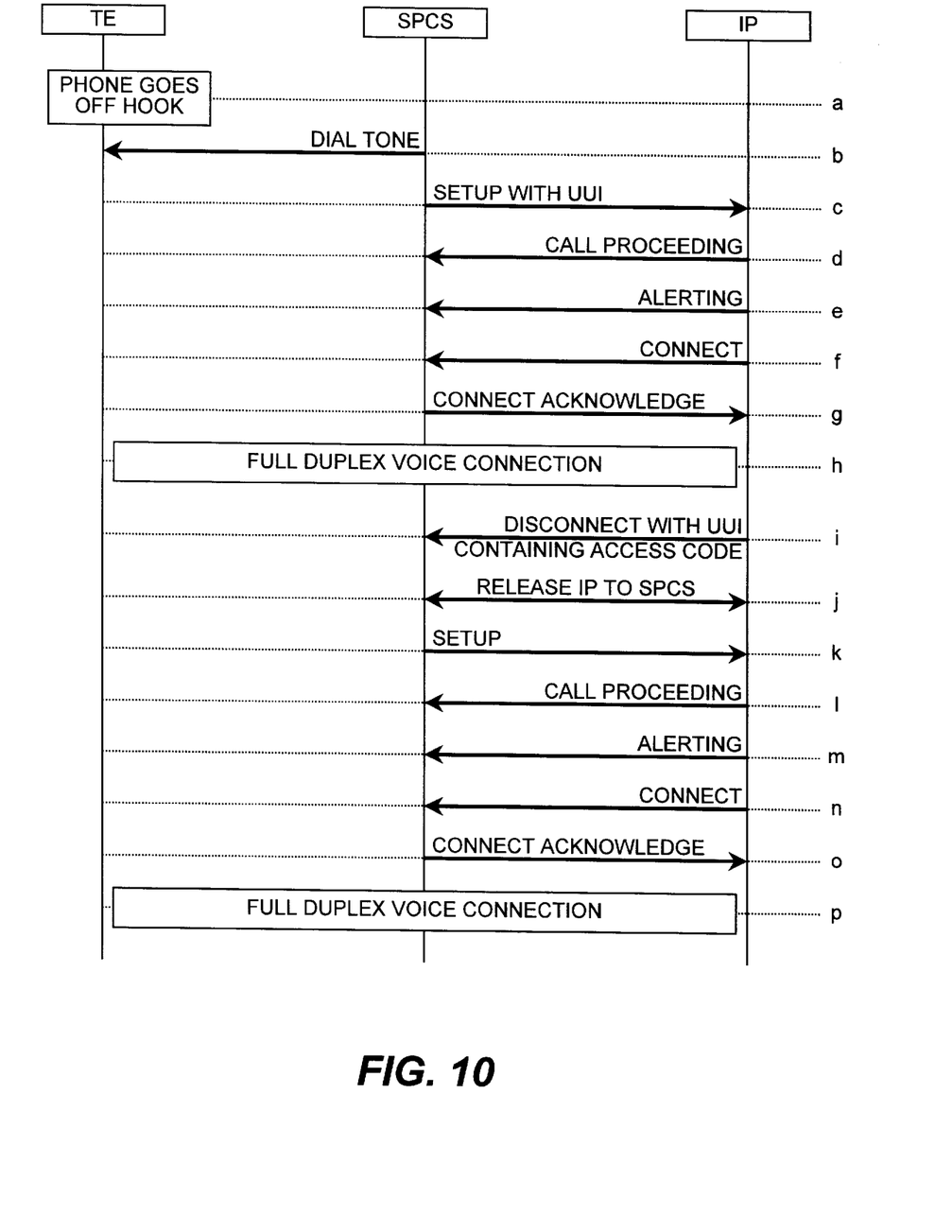
FIG. 10 shows a message flow diagram for the situation in which the subscriber wishes to connect explicitly to the IP via the VAD service to, for example, update a personal directory list.

FIG. 10 shows a message flow diagram for the situation in which the subscriber wishes to connect explicitly to IP 106 via the VAD service to, for example, update a personal directory list. In this situation steps a through j are the same as in FIG. 7. However, at h, the subscriber indicates that an explicit connection to the VAD application on IP 106 is desired. At i, the UUI element of the DISCONNECT message contains the explicit DN for the VAD application on IP 106. In steps k through p, SPCS 102 establishes an explicit voice connection between TE 101 and IP 106. At p, a full duplex voice connection has been established between TE 101 and IP 106 and the subscriber is able to access various maintenance functions associated with his VAD account, but is not able to automatically perform an outcall.

Figure 11:
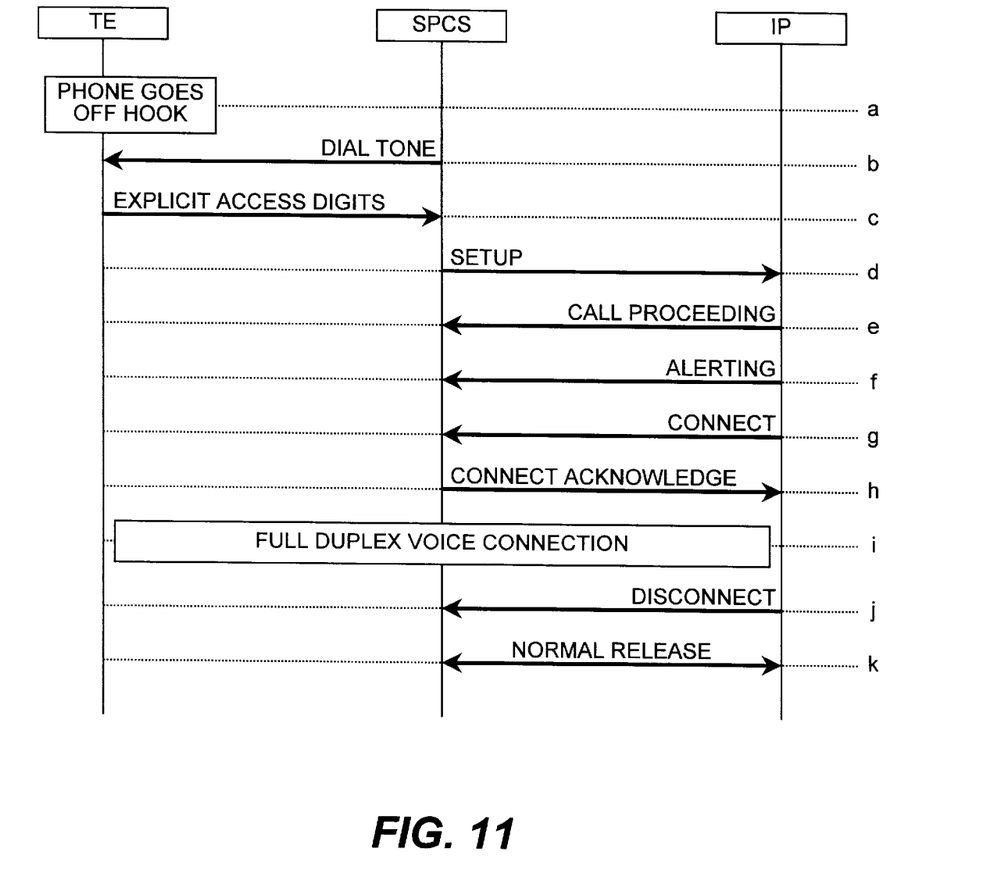
FIG. 11 shows a message flow diagram for the situation in which the subscriber directly dials the IP for explicit access to, for example, update a personal directory list.

FIG. 11 shows a message flow diagram for the situation in which the subscriber directly dials IP 106 for explicit access to, for example, update a personal directory list. At c, after the subscriber hears dial tone, he enters the DN for explicit access to the VAD application on IP 106. In steps d through i, SPCS 102 establishes an explicit voice connection between TE 101 and IP 106. At i, the subscriber is able to access various maintenance functions associated with his VAD account, but is not able to automatically perform an outcall. When the subscriber has completed his maintenance operations, he hangs up and at j and k, normal call clearing procedures for all circuit segments occurs.

Specific details for the implementation of the preferred embodiment are dependent on the make and model of the SPCS and IP used. An engineer skilled in the art will be familiar with the product-specific requirements needed to implement the invention on a given switch or IP.

While a preferred embodiment of the method and system in an ISDN network for exchanging call control information between a switch and an IP, and for call set-up and call clearing for intermediate access to an IP has been particularly shown and described, it is not intended to be exhaustive nor to limit the invention to the embodiment disclosed. It will be apparent to those skilled in the art that modifications can be made to the present invention without departing from the scope and spirit thereof. For example, other number translation applications besides VAD can be supported on the IP. The IP can also support non-translation applications, such as validation or subscriber dependent informational message delivery. Also, more elaborate information exchanges involving Q.931 message types other than SETUP and DISCONNECT that support the UUI element can be designed. It is intended that the scope of the invention be defined by the claims appended hereto and their equivalents.

What is claimed is:

1. A system for providing enhanced services to users of a telecommunication network having signaling traffic handled in accordance with a set of messaging protocols that support call establishment, call clearing and user-user information exchange, said network including a first user terminal operated to generate an off-hook signal in response to said first user terminal going off-hook and a plurality of second user terminals, said system comprising:

a stored-program-control switch in said network having said first user terminal and said plurality of second user terminals connected thereto, said switch operated in response to said off-hook signal to generate and transmit a call establishment message;

a processor in said network, connected to said switch over a voice and signaling link and operated in response to said call establishment message to establish a voice connection between said first user terminal and said processor, said voice connection comprising a first segment connecting said first user terminal and said switch and a second segment connecting said switch and said processor;

said processor further operated to execute an application to provide a destination directory number;

said processor further operated to generate and transmit to said switch a call clearing message including user-user information encoded with said destination directory number;

said switch further operated in response to said call clearing message to clear said second segment of said voice connection while maintaining said first segment; and said switch further operated in response to said user-user information to extend said first segment to the second user terminal associated with said encoded destination directory number.

2. A system for providing enhanced services according to claim 1, said telecommunications network being an Integrated Services Digital Network (ISDN) that supports Q.931 signaling protocol.

3. A system for providing enhanced services according to claim 2, wherein said user-user information is a User-User Information element.

4. A system for providing enhanced services according to claim 1, wherein said processor is an intelligent peripheral (IP).

5. A system for providing enhanced services according to claim 1, said first user terminal having a directory number, wherein:
- said call establishment message comprises user-user information encoded with the directory number of said first user terminal;
- said processor application further operated to decode said directory number of said first user terminal encoded in said user-user information; and
- said processor application further operated to provide said destination directory number based on said directory number of said first user terminal.

6. A method of providing enhanced services to users of a telecommunication network having signaling traffic handled in accordance with a set of messaging protocols that support call establishment, call clearing and user-user information exchange, comprising the steps of:
- detecting an off-hook condition by a stored-program-control switch of a calling user's telephone;
- sending a call establishment message in accordance with said protocols from said switch over a signaling access interface signaling channel to a processor in said network comprising an application operated to provide a destination directory number;
- establishing a voice connection between said first user terminal and said processor in response to said call establishment message, said voice connection comprising a first segment connecting said first user terminal and said switch and a second segment connecting said switch and said processor;
- determining a destination directory number by said processor application;
- sending a call clearing message in accordance with said protocols from said processor to said switch over said signaling channel;
- sending user-user information in accordance with said protocols from said processor to said switch over said signaling channel, said user-user information encoded with said destination directory number;
- clearing said second segment of said voice channel connection while maintaining said first segment in response to said call clearing message; and
- extending said first segment to the second user terminal associated with said encoded destination directory number in response to said switch receiving said destination directory number encoded in said user-user information.

7. A method of providing enhanced services according to claim 6, said telecommunications network being an Intergrated Services Digital Network (ISDN) that supports Q.931 signaling protocol.

8. A method of providing enhanced services according to claim 7, wherein said user-user information is a User-User Information element.

9. A method of providing enhanced services according to claim 6, said telecommunications network being an ISDN, wherein said signaling access interface is a Basic Rate Interface (BRI).

10. A method of providing enhanced services according to claim 6, said telecommunications network being an ISDN, wherein said signaling access interface is a Primary Rate Interface (PRI).

11. A method of providing enhanced services according to claim 6, said telecommunications network being an ISDN, wherein said processor is an intelligent peripheral (IP).

12. A voice activated dialing system in a telecommunication network including signaling traffic handled in accordance with a set of messaging protocols that support call establishment, call clearing and user-user information exchange, said network including a first user terminal operated to generate an off-hook signal in response to said first user terminal going off-hook and further operated to transmit spoken characters and commands, and a plurality of second user terminals, said voice activated dialing system comprising:
- a stored-program-control switch in said network having said first user terminal and said plurality of second user terminals connected thereto, said switch operated in response to said off-hook signal to generate and transmit a call establishment message;
- a processor in said network, connected to said switch over a voice and signaling link and operated in response to said call establishment message to establish a voice connection between said first user terminal and said processor;
- said processor further operated in response to said spoken characters and commands to generate a digit string in accordance to said spoken characters and commands;
- said processor further operated to generate and transmit to said switch a call clearing message including user-user information encoded with said digit string;
- said switch further operated in response to said call clearing message to clear said voice connection between said switch and said processor while maintaining said voice connection between said first user terminal and said switch; and
- said switch further operated in response to said user-user information to extend said voice connection between said first user terminal and said switch to the second user terminal associated with said encoded digit string.

13. A voice activated dialing system according to claim 12, wherein said switch is further operated in response to receiving dialed digits from said first user terminal to clear said voice connection between said switch and said processor while maintaining said voice connection between said first user terminal and said switch, and to extend said voice connection between said first user terminal and said switch to the second user terminal that corresponds to said dialed digits.

14. A voice activated dialing system according to claim 12, said telecommunications network being an Intergrated Services Digital Network (ISDN) that supports Q.931 signaling protocol, wherein said call establishment message is a Q.931 SETUP message.

15. A voice activated dialing system according to claim 12, wherein said processor is an intelligent peripheral (IP).

16. A voice activated dialing system according to claim 15, wherein said IP comprises a voice activated dialing application.

17. A voice activated dialing system according to claim 16, said first user terminal having a directory number, wherein:
said call establishment message comprises user-user information encoded with the directory number of said first user terminal; and
said voice activated dialing application further comprises a speaker-independent voice recognition subsystem operated to recognize predetermined control commands and digits, and a speaker-dependent voice recognition subsystem operated in response to said directory number to recognize custom control commands previously stored by said first user in an off-line process.

18. A voice activated dialing system according to claim 12, wherein said voice and signaling interface is a Basic Rate Interface (BRI) ISDN access interface.

19. A voice activated dialing system according to claim 12, wherein said voice and signaling interface is a Primary Rate Interface (PRI) ISDN access interface.

20. A voice activated dialing system according to claim 12, said telecommunications network being an ISDN that supports Q.931 signaling protocol, wherein said call clearing message is a Q.931 DISCONNECT message.

21. A voice activated dialing system according to claim 12, said telecommunications network being an ISDN that supports Q.931 signaling protocol, wherein said user-user information is a User-User Information element in said Q.931 DISCONNECT message.

22. A method of voice activated dialing in a telecommunications network including signaling traffic handled in accordance with a set of messaging protocols that support call establishment, call clearing and user-user information exchange, comprising the steps of:
detecting an off-hook condition by a stored-program-control switch of a calling user's telephone;
sending a call establishment message in accordance with said protocols from said switch over a signaling access interface signaling channel to a processor in said network comprising a voice activated dialing application;
establishing a first voice channel connection through said switch between said voice activated dialing application and said calling user's telephone in response to said call establishment message;
determining a called party directory number by said voice activated dialing application in response to spoken characters and commands from said calling user;
sending a call clearing message in accordance with said protocols from said processor to said switch over said signaling channel;
sending user-user information in accordance with said protocols from said processor to said switch over said signaling channel, said user-user information encoded with said called party directory number;
clearing the segments of said first voice channel connection between said switch and said processor in response to said call clearing message; and
establishing a second voice channel connection between said switch and the called party terminal associated with said called party directory number in response to said switch receiving said called party directory number encoded in said user-user information, said second connection being an extension of the segments of said first connection between said switch and said calling user's telephone.

23. A method of voice activated dialing according to claim 22, wherein the step of sending a call establishment message is preceded by the step of:
asserting dial tone on said calling user's telephone line for a predetermined interval to allow a connected modem to detect said dial tone.

24. A method of voice activated dialing according to claim 22, further comprising the step of:
clearing all voice connections between said calling user's telephone and said processor in response to said switch receiving dialed digits from said calling user's telephone, and completing the phone call according to the regular pre-established call handling procedures of said switch.

25. A method of voice activated dialing according to claim 22, said telecommunications network being an Intergrated Services Digital Network (ISDN) that supports Q.931 signaling protocol, wherein said call establishment message is a Q.931 SETUP message.

26. A method of voice activated dialing according to claim 22, said telecommunications network being an ISDN, wherein said signaling access interface is a Basic Rate Interface (BRI).

27. A method of voice activated dialing according to claim 22, said telecommunications network being an ISDN, wherein said signaling access interface is a Primary Rate Interface (PRI).

28. A method of voice activated dialing according to claim 22, said telecommunications network being an ISDN, wherein said processor is an intelligent peripheral (IP).

29. A method of voice activated dialing according to claim 22, said telecommunications network being an ISDN that supports Q.931 signaling protocol, wherein said call clearing message is a Q.931 DISCONNECT message.

30. A method of voice activated dialing according to claim 22, said telecommunications network being an ISDN that supports Q.931 signaling protocol, wherein:
said call clearing message is a Q.931 DISCONNECT message; and
said user-user information is a User-User Information element in said Q.931 DISCONNECT message.

* * * * *